Patented July 2, 1946

2,403,248

UNITED STATES PATENT OFFICE 2,403,248

IRON HYDRATE AND THE MANUFACTURE AND USE OF THE SAME

Seldon P. Todd, Gloucester City, and Fredric C. Verduin, Audubon, N. J., assignors to The Sherwin-Williams Company, Cleveland, Ohio, a corporation of Ohio No Drawing. Application April 10, 1941, Serial No. 387,874

13 Claims. (Cl. 23—200)

This invention relates to the production of an iron hydrate having excellent pigmentary properties and to a method of treating an iron-ammonium-fluoride whereby said iron hydrate is produced and other important advantages are achieved.

Various processes are known for the treatment of ilmenite with a fluorine containing compound, primarily to obtain titanium dioxide, and secondarily to recover the iron content of the ilmenite in commercially usable form. Examples of such processes are disclosed in the Svendsen U. S. Patents Nos. 2,042,435 and 2,167,784 and the Todd and Verduin application Serial No. 321,974, now Patent No. 2,355,187, dated Aug. 8, 1944.

In these processes ilmenite is digested and a soluble titanium compound is leached out or extracted with water to leave a residue composed essentially of a double fluoride of iron and ammonia. As the ammonia and the fluorine or compounds containing them are used in the digestion and treatment of the ilmenite, it is desirable to recover them for use in treating further quantities of ilmenite and to recover the iron for use as a pigment or for other purposes.

A method of recovering iron oxide and the ammonia and fluorine content of the residue mass is disclosed and claimed in the Svendsen Patent No. 2,167,784. That process involves the treatment of the residue with steam with or without air at a high temperature in a closed vessel to form iron oxide and hydrofluoric acid. Such ammonia as is present is recovered as ammonium fluoride. The ammonia- and fluorine-containing products or fumes are absorbed in water and the solution adjusted to the correct ratio and concentration of the two for use in digesting more ilmenite ore.

In carrying out our process, the residual cake which has been formed upon the separation of the soluble titanium fluoride compound from the mixture of titanium fluoride and iron fluoride compounds obtained by digestion of ilmenite ore with a fluorine-containing compound such as is described by Svendsen or by Todd and Verduin is given a light wash and then is made into a slurry and aerated or oxidized, for instance by blowing air through it. This oxidation almost completely converts the iron in the ferrous state to the ferric state. The slurry is then treated with ammonia or an ammoniacal ammonium fluoride liquor which converts the iron-ammonium-fluoride to hydrated ferric oxide and ammonium fluoride, the latter being recoverable for reuse in the process, as for the digestion of a further quantity of ilmenite ore.

As the iron in the digestion residue is present in both the ferrous and ferric states, and as the ferrous compound is appreciably soluble in the ammoniacal ammonium fluoride solutions, while the ferric compound is insoluble in this medium, the separation of iron from the conversion liquor is not complete when ferrous iron is present. This soluble iron fraction, when present in the filtrate after separating out the precipitated iron, causes trouble during the subsequent recovery of the ammonia and ammonium fluoride values therefrom. As the free ammonia is stripped from the solution, the solubility of the iron greatly decreases and a further progressive decrease in solubility occurs as the concentration of the ammonium fluoride increases during evaporation of the liquor, causing the iron-ammonium-fluoride to crystallize out on the walls or tubes of the evaporator as a strongly adherent crust. This greatly decreases the rate of heat exchange in the evaporators, and if the action is allowed to proceed long enough, the tubes become completely blocked with such crystals.

The important feature of the invention is the oxidation of the residual cake containing ammonia, fluorine and iron prior to the removal of the fluorine and ammonia values from said cake. This oxidation is effected without the necessity for high pressure, high temperature or calcination. As a further feature, our process makes it possible to use either the ammoniacal liquors from which the soluble titanium compound has been precipitated and separated or to use aqua ammonia for the purpose of effecting the liberation of the fluorine and ammonia values from the double iron and ammonium fluoride after the oxidation step above referred to. We have found that the presence of appreciable quantities of soluble fluoride salts such as ammonium fluoride greatly decreases the ability to obtain a high degree of oxidation and in high enough concentration would completely inhibit the reaction. The residual digestion cake obtained after removing the soluble titanium fluoride compound by filtration contains a considerable amount of soluble fluoride compounds and attempts to oxidize a slurry made directly from this cake either by air or electrolytically, resulted in only a partial or low degree of oxidation. For this reason we have found it essential that the cake, after separation from the titanium values, be washed sufficiently prior to oxidation to secure a reduction of the soluble fluorides present if substantially complete oxidation of the ferrous iron is to be attained. A slurry made from an unwashed cake may contain 8 or 10% or more of soluble fluorine, and washing of the cake to an extent such that the slurry made from it will contain only 1 or 2% of soluble fluorine is desirable.

After the oxidation, conversion and separation of the iron hydrate, the ammonia and fluorine values may be readily recovered without danger of encrusting the walls and tubes of the evaporator. The liquor may first be stripped of ammonia by distillation and the ammonia vapors may be absorbed in water to produce aqua ammonia. After the removal of the free ammonia, the residual liquor may be concentrated by evaporation under vacuum in order to obtain strong ammonium fluoride liquors suitable for use in digesting further quantities of ilmenite ore. The marked advantage of this process as compared to that of the Svendsen Patent No. 2,167,784 is that no hydrofluoric acid or other corrosive fumes are produced. All of the fluorine is recovered in combination with ammonia as ammonium fluoride or bifluoride solutions, thus eliminating the industrial hazard and corrosion which is present when working with free hydrofluoric acid.

The following examples are given merely to illustrate some of the procedures which have been employed, but it is to be understood that many variations in weight, proportions, concentrations, temperatures, etc. may be employed without departing from the scope or principles of this invention.

*Example 1.*—1,000 pounds of the iron-ammonium-fluoride cake resulting from leaching with water the digestion mass obtained from reacting ilmenite ore with strong ammonia fluoride solution, separating the residue from the liquor, and washing, was thoroughly mixed with 2,000 pounds of water. Analysis of this slurry showed:

| | Per cent |
|---|---|
| FeO | 2.21 |
| $Fe_2O_3$ | 5.96 |

The slurry was run into an aerator equipped for blowing the mass with air, as small bubbles, which thus provided for efficient dispersion of air and also agitation of the suspension. The oxidation was conducted at about 20° C. for a period of about two hours with an air delivery of approximately one liter of air per minute per pound of solids. At this time oxidation was substantially complete. Oxidation with chemicals, such as hydrogen peroxide, or electrolytically, may be substituted for the blowing with air but these render the operation more expensive. Similarly oxygen or ozonised air may be used instead of air, also at increased cost of operation, although there is some saving by reducing the time required. The use of such oxidizing agents as nitric acid, peroxide acids, dichromates, etc. is undesirable, since it introduces ions which would complicate the later recovery of ammonia and fluorine, although such agents do effect the oxidation of the ferrous ions to ferric. The aerated slurry showed an analysis of:

| | Per cent |
|---|---|
| FeO | 0.17 |
| $Fe_2O_3$ | 8.44 |

The slurry was then run into a closed reaction tank and 14,000 pounds of 12% aqua ammonia run in with agitation. The mixture was kept well stirred and held for forty-five minutes during which time the iron-ammonium-fluoride was converted to hydrated ferric oxide and the ammonium fluoride was freed. The suspension of ferric hydrate was filtered, the ammoniacal filtrate being sent to a recovery system for the recovery of ammonia and fluorine values. The cake was washed with 2,000 pounds of water. The wet iron hydrate, weighing 900 to 1,000 pounds, showed:

| | Per cent |
|---|---|
| $Fe_2O_3$ | 44.20 |
| FeO | 0.80 |
| $TiO_2$ | 3.18 |
| $NH_3$ | 0.26 |
| F | 1.64 |
| $H_2O$ | 47.10 |

*Example 2.*—1,000 pounds of well washed iron-ammonium-fluoride cake was diluted with water to a 40% solids concentration and worked to a uniform slurry. The charge was run into an aerating device provided with a suitable means for heating the charge to 60° C. and keeping it at that temperature during oxidation. Aeration was conducted for forty-five minutes at an air delivery rate of 2 liters per minute per pound of solids. The oxidized slurry was then run into 9,000 pounds of an ammoniacal ammonium fluoride solution (11% $NH_3$ and 8% $NH_4F$). The mixture was agitated for one hour and the ferric hydrate separated by filtration. The filtrate carried less than 0.0001% Fe and was sent to the recovery system for the recovery of ammonia and fluorine. The iron cake was washed with 2,000 pounds of water and dewatered to a cake of about 50% water. In a check run in which oxidation of the cake prior to conversion was not employed, 0.14% of Fe was found in the filtrate.

The ammoniacal ammonium fluoride solution used for the conversion was obtained as filtrate from the precipitation of titania hydrate from a solution of ammonia fluotitanate with aqua ammonia as described in U. S. patent application Serial No. 321,974, Todd and Verduin, in a process for the manufacture of titanium dioxide. We prefer to effect the conversion with this liquor for two specific reasons, first, in the practice of the titanium oxide process both the iron-ammonium-fluoride and the ammoniacal ammonium fluoride solutions are produced incidentally to the process, and since it is desirable to effect recovery of ammonia and fluorine from both of these items, the steps herein described offer a convenient method of recovery from both items simultaneously. Second, the presence of the considerable quantity of ammonium fluoride in the solution appears to assist in increasing the efficiency of conversion as against the use of straight aqua ammonia as in Example 1, and also to greatly improve the character of the iron hydrate as respects ease of commercial filtration, the hydrate from straight aqua ammonia conversion being considerably more slimy than when the excess $NH_4F$ is present.

In the practice of our invention, the iron-ammonium-fluoride cake, obtained by the digestion of ilmenite ores with ammonia fluoride, contains a small residual quantity of undigested ilmenite ore which has resisted the action of the reagent. In Example 1 this appears as 0.17% FeO in the aerated slurry and 0.80% FeO in the iron hydrate wet cake, such bound ferrous compound not being subject to oxidation by the procedures described. In Example 2 the ferric hydrate cake contains a similar amount of FeO tied up as ilmenite for the same reason. This undigested ilmenite is of larger particle size than the hydrous oxide and may be separated therefrom by elutriation or by passing the hydrous oxide through a hydroseparator or classifier after first reslurrying in water. For certain purposes such as for removal of $H_2S$ from gases this separation is not necessary, since the only objection to its presence appears to be due to the hardness and larger particle size of the undigested portion, which for some usages, as, for instance, when the product is to be used as a paint pigment would decrease its texture or necessitate severe pulverization or grinding.

*Example 3.*—The cake resulting from Example 2 above was suspended in water and to a concentration of approximately 10% solids and passed through a hydroseparator of the Dorr type. The overflow, carrying the hydrous oxide was settled and dewatered.

A typical analysis of the settled and dewatered cake obtained by the process of Example III is:

| | Per cent |
|---|---|
| FeO | 0.06 |
| $Fe_2O_3$ | 35.3 |
| $TiO_2$ | 2.49 |
| $NH_3$ | 0.20 |
| F | 1.35 |
| $H_2O$ | 56.00 |

It is characterized by its hydrous nature, a part of the water being in some manner combined with the iron. As such it is distinct from a calcined product such as is obtained by Svendsen's process or by calcination of the cake from Example 3. The process of formation described confers certain desirable properties of extremely small particle size and reactivity of the surface of the particles. Complete dehydration, as by calcination, tends to increase the particle size through aggregation and to modify the surface characteristics toward less reactivity. In order then to take maximum advantage of the original inherent characteristics of particle size and surface characteristics, it is desirable either to use the cake in its hydrous form or to replace the water by some means which will not alter these characteristics, such, for instance, as replacement of the free water by flushing with oil as described later herein.

The iron hydrate obtained is of exceedingly fine particle size, smooth, soft texture, and is of a clean reddish brown color of very high tinting strength or "staining power". Because of these properties our products possess marked advantages over similar prior art products in a number of usages.

The hydrated iron oxide formed upon decomposition of the iron fluoride by the action of the ammoniacal liquor after the oxidation step may contain small amounts of residual combined fluoride either due to incomplete reaction or to the presence of fluorides, such as calcium fluoride, which are not decomposed by the treatment. Such small amounts of residual fluorides, which have considerable chemical stability, do not seem to affect the quality of the iron oxide when used in paints. On the other hand, such residual fluorides seem to have some beneficial effect as a preservative against mold and the like, if the paint produced therefrom is used in moist locations. The residual combined fluorine usually is present in an amount less than 5% and usually less than 2%.

Similarly our products carry a small percentage of titanium. The larger amount of titanium present than is required to combine with the FeO in the proportions of ilmenite, is present as hydrolyzed $TiO_2$. After the washing steps a certain amount of titanium salts remain in the cake and these are converted to $TiO_2$ upon contact with the ammoniacal liquor. The total amount of titanium in the product is usually less than 5%.

USES

The wet cake of either of the Examples 1, 2, or 3, but preferably Example 3, may be dried down and pulverized in any of the usual dry disintegration or impact mills to produce a soft textured, easily pulverizable powder of clear brown tone, similar to high grade sienna, of very small particle size, on the average between $0.2-0.8\mu$ and having a tinting strength considerably greater than the natural siennas.

The drying should be conducted at a sufficiently low temperature so that the water is not completely eliminated, as, for instance, at 100° C. to 110° C. The "dried" product should contain a certain percentage of water or other volatiles that are capable of being removed by high ignition to insure its remaining as a hydrous oxide. A typical analysis of a product produced by drying at 100° C. showed:

| | Per cent |
|---|---|
| $Fe_2O_3$ | 68.9 |
| FeO | 0.08 |
| $NH_3$ | 0.13 |
| F | 2.21 |
| $TiO_2$ | 3.78 |
| $H_2O$ | 17.9 |

FLUSHING

Any of the hydrous oxides of Examples 1, 2, or 3, or the dried hydrate or the oxides produced from them by calcination when such are re-wet in water for washing or wet-mill processing, may be flushed in oil by the usual methods of replacing the water with linseed or other drying oil, to produce an oil paste admirably adapted for use as a pigment-in-oil in the manufacture of paints.

Any of a number of procedures well known in the art may be used for the replacement of the water in the hydrous iron oxide pulp by air drying oil or a mixed vehicle of the sort used for paint bases. As an example, the following is given.

*Example 4.*—228 pounds of the hydrous oxide cake from Example 3, containing approximately 44% solids and 56% water was placed in a tank provided with an agitator and 232 pounds of water added. When the slurry was uniform 40 pounds of aqueous solution of a soap, equivalent to 4 pounds of Ivory soap was added and well mixed. The temperature was raised to 80° C. and agitation continued until coagulation was effected. 50 pounds of linseed oil was then run into the slurry and agitation continued. The water was replaced from the pigment, separating on the top of the pigment-in-oil paste. The water was poured off and the oil paste run over a three roller paint mill to squeeze out the small quantity of entrapped water. The base thus obtained contained 65% solids, 34% oil, and 0.8% water. As an alternative for this last step, a vacuum mill may be used to ensure complete elimination of the water.

In the flushing operation any of the other flushing agents well known in the art may be employed instead of the one given in the example, or, instead of linseed oil, any of the customary drying or semi-drying, raw or bodied, or non-drying oils used in the art of making paint, such, for instance, as combination alkyd or other resin-bodied linseed or other drying oil vehicle or such combination modified with soya bean, castor or similar oil may be used.

The paste or base is smooth, fine textured, of high hiding or staining power, and of a pleasing brown color lending itself admirably to change of color by addition of other pigment color, such as lamp black, carbon black, and iron oxides, chrome yellow, etc., for the production of desirable shades, and to the addition of oils, thinners, or driers for production of ready mixed paints.

CALCINATION

By calcination of the hydrous oxides from any of the Examples 1, 2, or 3, but preferably after separation of the undigested ilmenite and coarse particles as in Example 3 a very satisfactory red iron oxide pigment may be obtained. We have found a calcination at a temperature of 550° C. for two hours well adapted to the development of color. A typical assay of a calcined iron oxide produced as described, showed:

| | Per cent |
|---|---|
| $Fe_2O_3$ | 84.13 |
| $FeO$ | 0.07 |
| $TiO_2$ | 4.86 |
| $F$ | 1.12 |

GAS PURIFICATION

We have found that the hydrous iron oxide obtained by any of the Examples 1, 2, or 3 may be used in gas purification, for the removal of hydrogen sulfide from commercial gases such as illuminating gas. We have found that in this usage our novel compound possesses marked superiority over heretofore known and commercially available materials.

The hydrous oxide may be prepared for use in either of two well known processes for gas purification. Method I consists in the impregnation of wood shavings with a slurry of hydrous oxide in water to obtain a uniform distribution of oxide on the shavings and creating a large surface area for contact packed in boxes or towers. The gas containing the $H_2S$ is passed over this mass and absorption of $H_2S$ takes place. A series of boxes is usually used for this purpose. The mass when fouled, that is, when it has absorbed its maximum sulfur content, can be revived by one of three methods: (1) by the introduction of air during the fouling period, (2) by cutting out the box and introducing air alone, (3) by removing the sponge from boxes and exposing to the air.

PURIFIER REACTIONS (1) $Fe_2O_3.H_2O + 3H_2S = Fe_2S_3 + 4H_2O$
(2) $Fe_2O_3.H_2O + 3H_2S = FeS + S + 4H_2O$

Revivification of fouled oxide (3) $2Fe_2S_3 + 3O_2 + 2H_2O = 2Fe_2O_3.H_2O + 6S$
(4) $4FeS + 3O_2 + 2H_2O = 2Fe_2O_3.H_2O + 4S$ Method II consists in the suspension of hydrous oxide of iron in a solution of sodium carbonate. The $H_2S$ in this case is fixed in the $Na_2CO_3$ solution and then taken up by the iron oxide. The fouled oxide is then oxidized by aeration. The free sulfur and part of the iron floated off.

The table below is given as an example of superior purifying properties of our new composition. A standard procedure for evaluating absorption capacity and the renewal of activity upon revivification as used in the gas industry is the so-called Kunberger fouling test. This test was conducted in the following manner.

Three grams of the hydrous oxide to be tested were thoroughly mixed with five grams of sawdust —20, plus 40 mesh, and 5 cc of water. A "fouling tube" was prepared by placing a 1¾" of 12 mesh calcium chloride in the bottom of a Nesbitt absorption bulb. The calcium chloride was then covered with a thin layer of cotton and the oxide-sawdust mass placed on top of the cotton. The tube was then placed in a train set up so that $H_2S$ from a Kipp generator passed first through a 6 mm. (inside diameter) glass tube immersed 6" into a water seal at a rate of approximately 100 bubbles per minute, or about one cubic foot per hour, then through a calcium chloride drying cylinder, and then through the absorption tube containing the fouling mixture under test. The gas was passed through for a period of one hour and the bulb removed and weighed. The increase in weight divided by three and multiplied by 100 is the Kunberger fouling on the dry basis. The percentage fouling on the wet cake basis may be then calculated from this result.

For revivification, the fouled sample was removed from the Nesbitt bulb and spread out on a six inch diameter watch glass, moistened with 5 cc. of water and allowed to stand in a warm place, turning occasionally with a spatula until oxidation was complete as shown by absence of black spots.

The revivified sample was then returned to the Nesbitt bulb, after moistening with 5 cc. of water and again treated with $H_2S$ as before. The fouling and revivification may be repeated as many times as desired, the sample being evaluated according to the rate of decrease in ability to absorb $H_2S$ on successive foulings, or by average absorption over a given number of foulings.

Samples A, B, and C represent three currently commercial materials used in large quantities by the illumination gas industry. Sample D represents the product obtained in Example 2. A high first fouling is desirable, since in practice a considerable loss of material occurs on each revivification, and in addition it is the practice in quite a few plants to discard after first or second fouling and not attempt further revivification.

Kunberger foulings

| | Sample A | Sample B | Sample C | Sample D |
|---|---|---|---|---|
| #1 | 37.30 | 28.33 | 52.60 | 50.20 |
| #2 | 45.70 | 28.67 | 20.50 | 49.00 |
| #3 | 47.20 | 28.76 | 21.40 | 47.90 |
| #4 | 47.20 | 28.93 | 21.56 | 46.60 |
| Average | 44.40 | 28.67 | 29.01 | 48.42 |

Having thus described our invention, what we claim as new and desire to secure by Letters Patent is:

1. In a method of preparing an iron hydrate by the treatment of the iron-ammonium-fluoride formed by the action of ilmenite with ammonium fluoride, the step which comprises oxidizing said iron-ammonium-fluoride in the presence of water at atmospheric pressure and not above the boiling point of the water prior to the conversion of the iron-ammonium-fluoride into the iron oxide compound.

2. In a method of preparing an iron hydrate by the treatment of the compound formed by the action of ilmenite with ammonium fluoride, the steps which comprise oxidizing said iron-ammonium-fluoride in the presence of water at atmospheric pressure and not above the boiling point of the water, thereafter introducing ammonia to effect the conversion of the iron-ammonium-fluoride to the iron oxide material, and thereafter removing sufficient water to leave iron hydrate in substantially dry form.

3. The method of preparing a hydrated iron oxide material which includes forming a slurry of iron-ammonium-fluoride, oxidizing the material in the slurry with air, thereafter treating the slurry with ammonia to form hydrated ferric oxide and ammonium fluoride.

4. The method of preparing a hydrated iron oxide which includes forming a slurry with the iron-ammonium-fluoride cake resulting from leaching with water the digestion mass obtained from reacting ilmenite ore with strong ammonium fluoride solution, and separating said cake from the leach liquor, aerating said slurry by contacting it with air at about 20° C. for a period of about two hours, thereafter mixing said slurry with ammonia to form hydrated ferric oxide and ammonium fluoride and separating said hydrated ferric oxide from the water.

5. The method of preparing a hydrated iron oxide which includes forming a slurry with the iron-ammonium-fluoride cake resulting from leaching with water the digestion mass obtained from reacting ilmenite ore with strong ammonium fluoride solution, and separating and washing said cake from the leach liquor, aerating said slurry by contacting it with air, thereafter mixing said slurry with an ammoniacal liquor selected from the group consisting of aqua ammonia and ammoniacal ammonium fluoride liquor, to form hydrated ferric oxide and ammonium fluoride and separating said hydrated ferric oxide from the water.

6. The method of preparing a hydrated iron oxide which includes forming a slurry with the iron-ammonium-fluoride cake resulting from leaching with water the digestion mass obtained from reacting ilmenite ore with strong ammonium fluoride solution, and separating and washing said cake from the leach liquor, aerating said slurry by contacting it with air, thereafter mixing said slurry with an ammoniacal liquor selected from the group consisting of aqua ammonia and ammoniacal ammonium fluoride liquor, from which said cake had been separated and from which the titanium had later been separated, thereby forming hydrated ferric oxide and ammonium fluoride and separating said hydrated ferric oxide from the water.

7. The method of preparing hydrated iron oxide by treatment of the residual iron-ammonium-fluoride separated from the mass resulting from treating titanium iron fluoride with ammonium fluoride, the step which comprises forming a slurry of said iron-ammonium-fluoride and water, oxidizing the slurry and thereafter treating it with ammonia to form hydrated iron oxide and ammonium fluoride.

8. The method of forming an iron hydrate from iron-ammonium-fluoride which includes forming a slurry of said iron-ammonium-fluoride and water, oxidizing the fluoride in the slurry, thereafter mixing the ammoniacal liquor selected from the group consisting of aqua ammonia and ammoniacal ammonium fluoride liquor, with the slurry to form said iron hydrate and ammonium fluoride, and thereafter separating the iron hydrate from the slurry and washing it with water.

9. The method of forming an iron hydrate from iron-ammonium-fluoride which includes forming a slurry of said iron-ammonium-fluoride and water, bubbling air through the slurry to convert the iron from the ferrous to the ferric state, thereafter mixing an ammoniacal liquor selected from the group consisting of aqua ammonia and ammoniacal ammonium fluoride liquor, with the slurry to form said iron hydrate and ammonium fluoride, and thereafter separating the iron hydrate from the slurry and washing it with water.

10. The process which comprises treating ilmenite with ammonium fluoride to form a reaction mass, extracting the resulting titanium compound from said mass with water, forming a slurry of the residual mass, aerating the slurry to convert the iron present from the ferrous to the ferric state, treating the slurry with ammonia to form hydrated ferric oxide and ammonium fluoride and using said ammonium fluoride for the treatment of further ilmenite.

11. The process which comprises heating ilmenite with ammonium fluoride to form a reaction mass, extracting the resulting titanium compound with water, treating the extract to convert the titanium compound to $TiO_2$, removing the $TiO_2$ from the residual ammoniacal liquor, forming a slurry of water and the residue after said extraction, oxidizing the slurry to convert the iron present from the ferrous to the ferric state, thereafter treating the slurry with the ammoniacal liquor from which the $TiO_2$ has been separated, to thereby form hydrated $Fe_2O_3$ and ammonium fluoride, separating the hydrated $Fe_2O_3$ and ammonium fluoride and using the ammonium fluoride for the treatment of further ilmenite.

12. The method of forming an iron oxide pigment which includes forming a slurry of iron-ammonium-fluoride with water, oxidizing the iron from the ferrous to the ferric state in the slurry, mixing ammonia with slurry to form hydrated ferric oxide, removing the ferric oxide from the residual liquor, washing with water, drying and pulverizing to produce a soft textured powder of clear brown color and particle size between 0.2 and 0.8 microns and having a tinting strength considerably greater than natural siennas.

13. The method of forming a hydrated iron oxide pigment composition comprising forming a slurry of water and iron-ammonium-fluoride containing a small amount of titanium dioxide, oxidizing the slurry, thereafter treating the slurry with ammonia, separating the resulting hydrated ferric oxide, washing it with water and drying it at a temperature of about 100° C. to 110° C. to an easily pulverizable mass containing sufficient water to insure a hydrous condition but capable of being removed by high ignition.

SELDON P. TODD.
FREDRIC C. VERDUIN.